(12) United States Patent
Griffin

(10) Patent No.: US 7,583,320 B2
(45) Date of Patent: Sep. 1, 2009

(54) DIGITAL IMAGE DISPLAY SYSTEM

(76) Inventor: Darrell Griffin, 4717 Van Nuys Blvd., Suite 105, Sherman Oaks, CA (US) 91403

( * ) Notice: Subject to any disclaimer, the term of this patent is extended or adjusted under 35 U.S.C. 154(b) by 818 days.

(21) Appl. No.: 11/354,347

(22) Filed: Feb. 13, 2006

(65) Prior Publication Data
US 2007/0188446 A1    Aug. 16, 2007

(51) Int. Cl.
H04N 3/14 (2006.01)
H04N 9/12 (2006.01)
G09G 3/36 (2006.01)

(52) U.S. Cl. ............... 348/552; 348/739; 348/790; 348/825; 348/14.04; 345/530; 345/87

(58) Field of Classification Search ......... 348/790, 348/552, 739, 715, 730, 825, 14.04, 14.07; 345/156, 87, 212, 530, 547
See application file for complete search history.

(56) References Cited

U.S. PATENT DOCUMENTS

| 6,396,472 | B1 | 5/2002 | Jacklin |
| 6,717,567 | B1 | 4/2004 | Bowden |
| 6,897,891 | B2 * | 5/2005 | Itsukaichi ............. 348/14.1 |
| 7,107,516 | B1 * | 9/2006 | Anderson et al. ......... 715/210 |
| 2005/0271072 | A1 * | 12/2005 | Anderson et al. ......... 370/419 |

* cited by examiner

Primary Examiner—David L Ometz
Assistant Examiner—Jean W Désir
(74) Attorney, Agent, or Firm—J. Curtis Edmondson

(57) ABSTRACT

A dynamic picture display system. The system consists of an LCD display that is approximately the size of a framed picture, a USB cable that is connected to the LCD display, and a computer system for formatting still or moving images, (pictures) for display on the computer system.

12 Claims, 4 Drawing Sheets

USB Picture Frame Block Components

USB Picture Frame Block Components

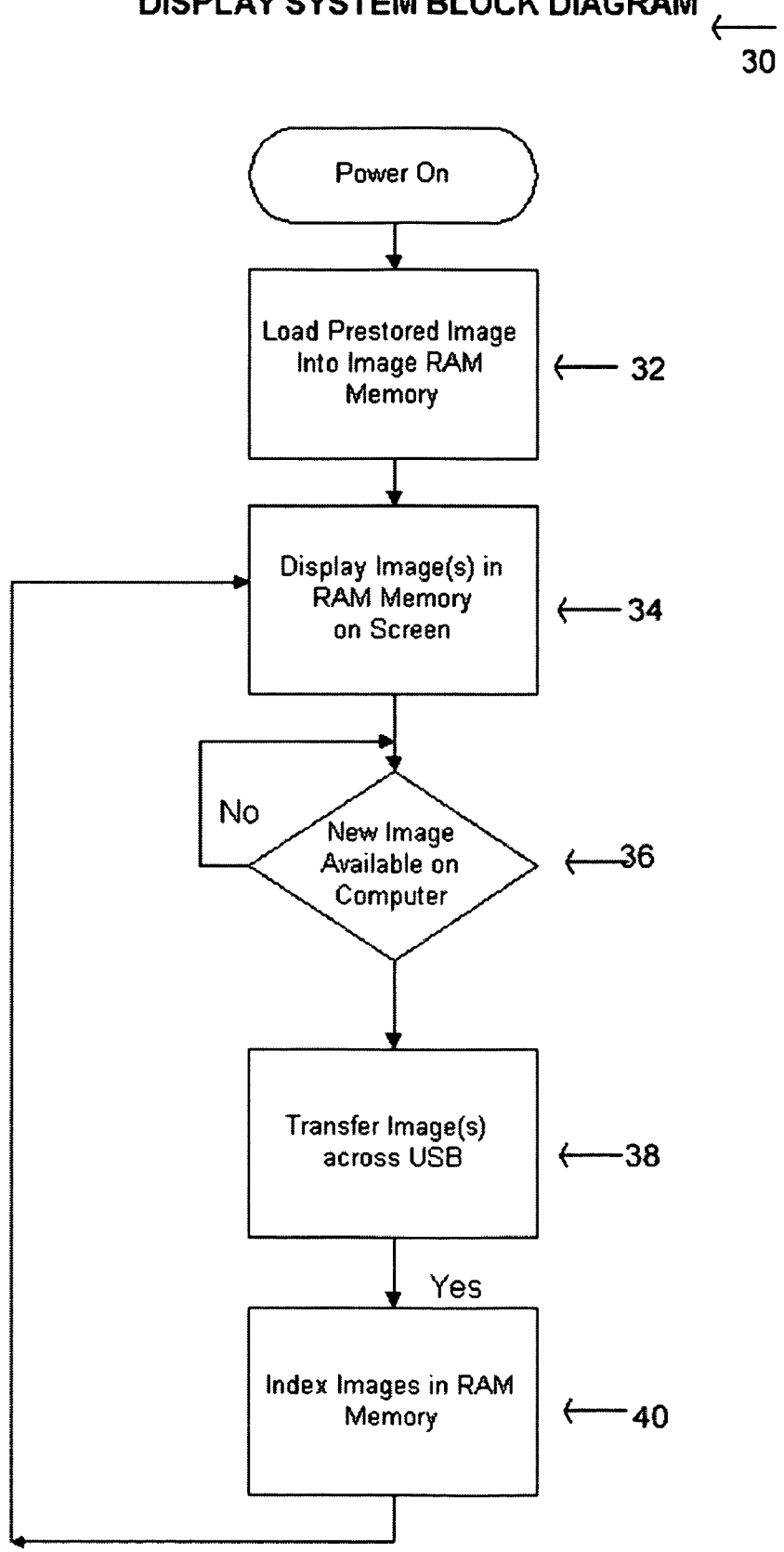

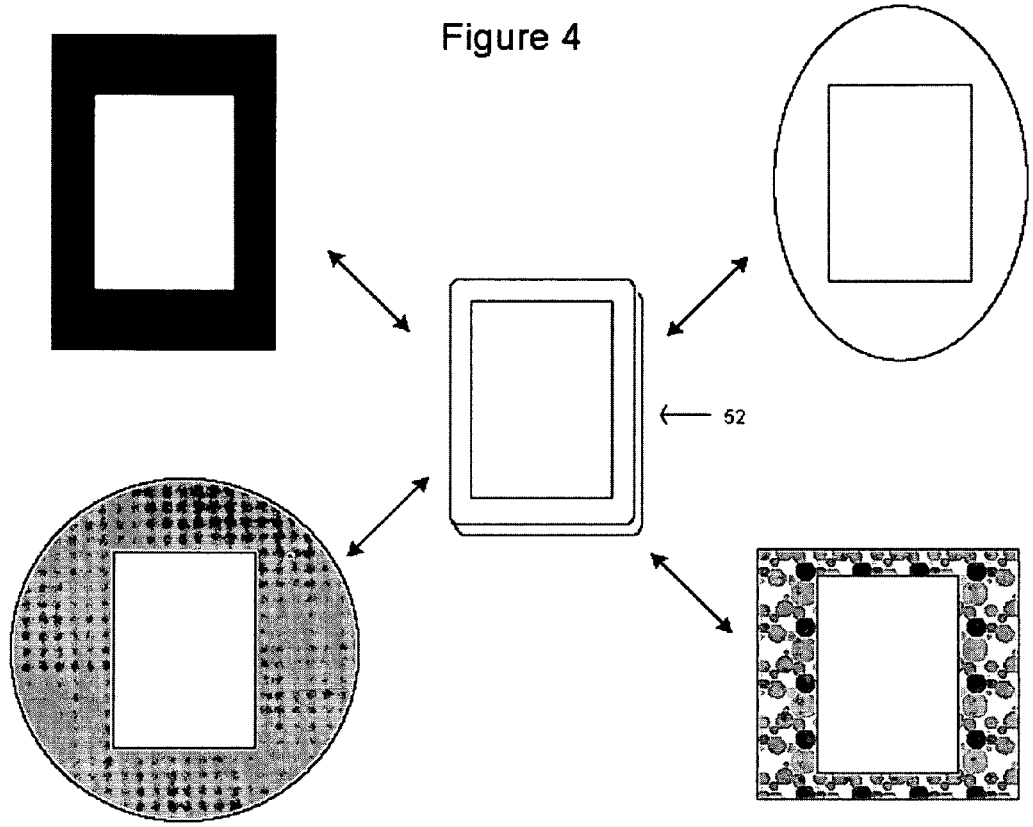

DIGITAL IMAGE DISPLAY SYSTEM

BACKGROUND OF THE INVENTION

1. Field of the Invention

The present invention relates to image display systems and, more particularly, to image display systems that both interact with personal computers or function individually.

2. Overview of the Prior Art

The framed painting, photograph, print, or lithograph, have been objects of visual enjoyment for centuries. These objects of visual enjoyment suffer from a number of limitations. First they are essentially static and must usually be replaced whenever the room interior in which they are displayed is changed. If the objective of visual enjoyment is a piece of original or rare artwork, it may be hard to acquire. These objects of visual enjoyment can deteriorate or get destroyed and be difficult to replace. Many people have photographs that they like to display in picture frames. Only one object can be placed in any one frame at a time. Currently many people display pictures in picture frames that are static and require a number of picture frames to display their favorite pictures. Many people take digital pictures and store them on their computer for later viewing. When pictures are stored on personal computers they can not be effective enjoyed while the computer user is using the computer for purposes other than viewing the pictures.

The drawbacks of traditional paintings, prints, and photographs are obvious: they are prone to destruction, theft, and replacement when the person tires of their static image.

Some of the earliest attempts at protecting or distributing a rare painting was by distributing a copy (or a print) of the painting. This allowed a large number of people to enjoy a rare painting, but this did not overcome the problem of the print needing to be replaced if the interior design of the room where the print was displayed was changed.

There are devices that provide dynamically changing pictures. And early method consisted of paper sheets with images wound on spools. These spools are mounted on each end of picture frame. An electrical or mechanical drive mechanism would rotate the spools providing the dynamically displayed image.

The placement of images of paper that are rotated to present a dynamic image, is that the once all of the images are viewed, they suffer from the same problem as fixed images. Also, the transitions from one image to another image results in a discontinuity between the images that can only be resolved after much effort.

As technology improved, it became obvious that a television could be mounted into a wall to provide a dynamically changing picture. This solution had a number of advantages, but the most obvious was that the picture was electronic, and the cost of changing or replacing the picture was as easy as changing the electronic transmission. A television set mounted in a wall is an obvious improvement because the image is now dynamic. But there are certain drawbacks to televisions mounted on the wall. If they are inset into the wall to accommodate the picture tube, then repair access is a problem. Also relocation of the picture requires patching the wall and building a new enclosure. The signal being transmitted to the television has the drawback of operating on a fixed number of frequencies. Finally, the resolution of the picture screen is limited by the television signal specification.

The television has given way to the LCD screen television displays. This technology uses a solid state display rather than a cathode ray tube (CRT) display that is a part of traditional television sets. An LCD display has the advantages of being 'thin', with narrow borders, almost the dimensions of picture itself. This technology requires a system to transmit the images to the television receiver.

LCD television sets do not have the mechanical limitations of traditional picture tubes, but they do have the drawback of operating on television signal frequencies. Also, they are limited in their resolution capabilities.

An improvement to the wall mounted LCD screen television is described by Jacklin in U.S. Pat. No. 6,396,472 B1 (2002) (hereinafter the '472 patent). The '472 patent overcomes the limitations of the television signal by incorporating a memory card as the device which stores the image. This provides the added benefit that a series of images can be stored on the memory card, for display. The images are displayed on the screen with a higher resolution than images displayed from a television signal. Also, a number of different images can be stored on each memory card.

The system described in the '472 patent, is a great improvement over the LCD screen television system for displaying pictures, in terms of improving resolution for the displayed image. Also the memory card eliminates the need to have the image transmitted via a television signal. But a major drawback of the system is that it requires an onboard display processing system and a memory card interface.

An improvement to the '472 patent is described by Bowden, III, et. al, in U.S. Pat. No. 6,717,567 B1 (2004) (hereinafter the '567 patent). The '567 patent overcomes the limitations of the television signal and the memory card by incorporating wireless connection to the display. This wireless connection allows images to be transmitted to the display from a computer without the use of a memory card.

The system described in the '567 patent has the added advantage of the display being modifiable or changed without the use of memory cards. A drawback of the '567 system, however, is the added cost of incorporating a wireless receiver, memory card, and transmitter.

Another limitation of the '567 patent is the fact that it does not have continuous access to the user's picture files on their personal computer, and provides no solution for selecting those pictures that the user wishes to display on a separate picture frame connected to their personal computer.

It is therefore an object of the invention to provide for a dynamic digital picture display system that serves as a more flexible substitute to the conventional picture frame.

SUMMARY OF THE INVENTION

In accordance with the present invention, there is provided a dynamic digital picture display system. The system consists of a stand alone LCD or other electronic display screen which displays digital pictures in color. The System is composed of a picture frame, an electronic LCD display, a USB wire or other similar electronic connecting or wireless device that connects the LCD display to a host computer, software that resides on the host computer for formatting and performing other operations on pictures for display on the attached electronic display. The physical housing of the unit allows for interchangeable frame faces for different appearances of the physical unit.

Another embodiment of the system will allow the electronic display screen to display select information from the user's desktop information database such as important dates, time, tasks and meetings and other information that is normally included in computer programs such as, but not limited to Microsoft Outlook.

BRIEF DESCRIPTION OF THE DRAWINGS

A complete understanding of the present invention may be obtained by reference to the accompanying drawings, when considered in conjunction with the subsequent, detailed description, in which:

FIG. 3 is a flow chart of a software system that loads images onto screen.

FIG. 4 is a front view of an Interchangeable picture frame faces.

For purposes of clarity and brevity, like elements and components will bear the same designations and numbering throughout the FIGURES.

DETAILED DESCRIPTION OF THE DRAWINGS AND THE PREFERRED EMBODIMENTS

In the following description, various aspects of the present invention will be described. Those skilled in the art will also appreciate that the present invention may be practiced with only some or all aspects of the present invention. For purposes of the explanation, specific numbers, materials, and configurations are set forth in order to provide a thorough understanding of the present invention. However, it will also be apparent to one skilled in the art that the present invention may be practiced without specific details. In other instances, well known features are omitted or simplified in order not to obscure the present invention.

Figure 1:
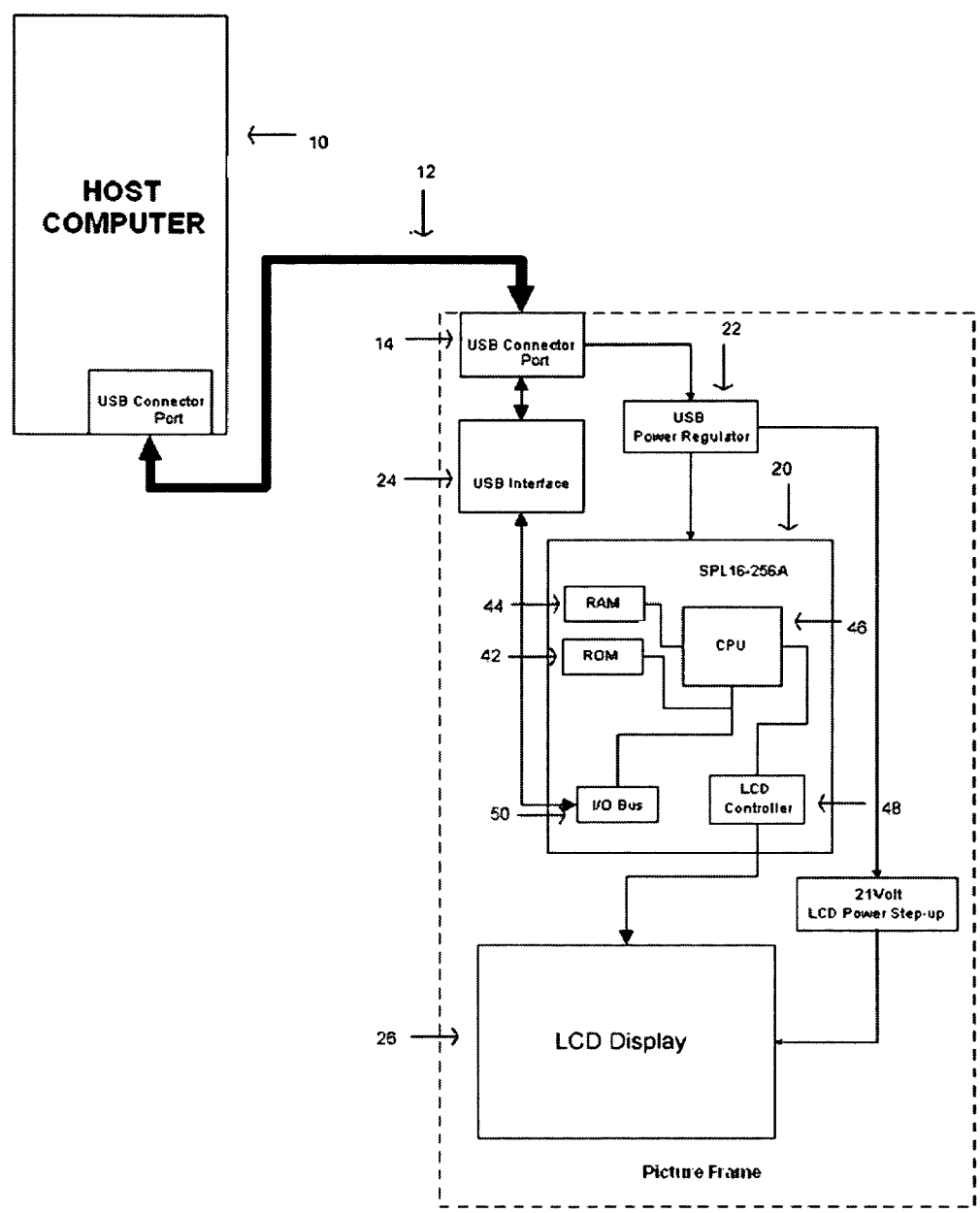
FIG. 1 is a block diagram of the USB picture components in accordance with the invention.
Figure 2:
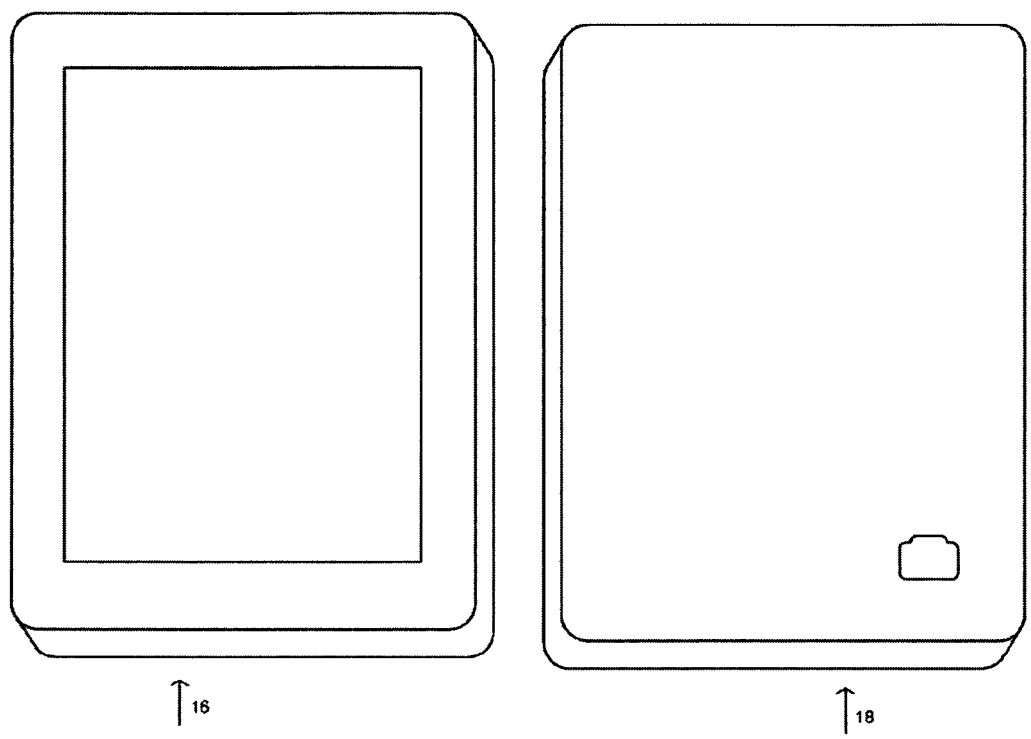
FIG. 2 is a perspective view of a front and back display of the picture screens.

Referring to FIGS. 1, 2, and 3, a single embodiment of the image display system is shown. The three primary components of the image display system consists of a computer 10, a picture frame 14, and a USB cable or other connection method 12 that connects the computer 10 to the picture frame 14.

The computer 10 has imaging software that allows the user of the computer 10 to import, export, manipulate, and create, digital images either still or moving. This imaging software is proprietary to this device. A version of the transfer software technology is used to interface the imaging software to an external device. Most computers include a USB port or wireless component allowing data to be transferred to peripherals.

The mechanical configuration of the image display system consists of a front bracket 16 (FIG. 2), where the front part of the LCD display 26 is mounted. The front bracket 16 is affixed to the rear bracket 18. On the rear bracket 18 is a USB connector 22 where the USB cable or other connection method 12 connects the computer 10.

Internal to the image display system, the USB connector 22 provides both data and power thereto. The USB power regulator 20 provides power to the display system controller 28, the display, and the USB interface 24.

Located within the display system controller 28 is a software system. This software system embodies a method for displaying graphics 30 (still photographs, moving images, animation, etc.) on the image display system. The software provides a function to retrieve the image from the USB interface 24 and to store it in local memory on the image transfer 38 module, displaying the image on the LCD display 26, a system for image polling 36, transferring the image to the LCD display 26, image retrieval module 32, indexing images, image indexing module 40, in a predetermined sequence.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A digital image display system for displaying dynamically changing electronic images for general viewing comprised of:

means for providing images to be transferred;

means for transferring data, electrically coupled to said means for providing images to be transferred;

means for display dynamic image, electrically coupled to said means for providing a means for transferring data;

means for mechanically supporting rear section of said LCD display, mechanically fitted to said means for providing a means for transferring data;

means for regulating power;

means for mechanically and electrically connecting, mechanically connected to said means for providing a means for transferring data;

means for interfacing the USB signal to said display system controller, electrically connected to said means for mechanically and electrically connecting, and electrically connected to said means for regulating power;

means for projecting the stored image on a mosaic LCD or other digital display system in color using proprietary software, electrically connected to said means for regulating power;

means for transferring and manipulating images on said LCD display via proprietary software and smart transfer technology drivers, electrically connected to said means for interfacing the USB signal to said display system controller;

means for proprietary software to retrieve, poll, transfer, and index images on said image display;

means for retrieving images from said image memory, algorithmically interfaced to said means of software to retrieve, poll, transfer, and index images on said image display;

means for display of images located in said memory, algorithmically interfaced to said means for software to retrieve, poll, transfer, and index images on said image display;

means for detecting if images need to be transferred from said computer via drivers comprised of software, algorithmically interfaced to said means for software to retrieve, poll, transfer, and index images on said image display;

means for transferring images from said computer via drivers comprised of software, algorithmically interfaced to said means for software to retrieve, poll, transfer, and index images on said image display;

means for sorting images on said image display via imaging software, algorithmically interfaced to said means for software to retrieve, poll, transfer, and index images on said image display; and means for changing the physical appearance of the unit.

2. The digital image display system in accordance with claim 1, wherein said means for providing images to be transferred comprises an image storage and image manipulation computer.

3. The digital image display system in accordance with claim 1, wherein said means for providing a means for transferring data comprises and allows data transfer via USB cable or other connection method.

4. The digital image display system in accordance with claim 1, wherein said means for display dynamic image comprises a picture display picture frame.

5. The digital image display system in accordance with claim 1, wherein said means for interfacing the USB signal to said display system controller comprises an USB interface.

6. The digital image display system in accordance with claim 1, wherein said means for projecting the stored image on a mosaic LCD or other digital display system in color using software comprises a LCD display.

7. The digital image display system in accordance with claim 1, wherein said means for proprietary software and smart transfer technology drivers to retrieve, poll, transfer, and index images on said image display comprises a method for displaying graphics.

8. The digital image display system in accordance with claim 1, wherein said means for detecting if images need to be transferred from said computer via drivers comprised of the patent pending smart transfer technology comprises an image polling.

9. The digital image display system in accordance with claim 1, wherein said means for sorting images on said image display via proprietary imaging software comprises a configurable image indexing module.

10. The digital image display system in accordance with claim 1, wherein said means for changing the physical appearance of the unit comprises different style mounts on the unit face interchangeable picture frame faces.

11. A digital image display system for displaying dynamically changing electronic images for general viewing comprising:
   an image storage, image manipulation computer, for providing images to be transferred;
   that allows data transfer via USB cable or other connection method, for providing a means for transferring data, electrically coupled to and from said computer;
   a picture display picture frame, for display dynamic image, electrically connected to said USB cable or other connection method;
   a rear bracket, for mechanically supports rear section of said LCD display, mechanically fitted to said USB cable or other connection method;
   a provides regulated power USB power regulator, for regulating power;
   a data and power interface USB connector, for mechanically and electrically connecting, mechanically connected to said USB cable or other connection method;
   an USB interface, for interfacing the USB signal to said display system controller, electrically connected to said USB connector, and electrically connected to said USB power regulator;
   a displays image LCD display, for projecting the stored image on a mosaic LCD or other digital display system in color using proprietary software, electrically connected to said USB power regulator;
   a display system controller, for transferring and manipulating images on said LCD display via proprietary software and smart transfer technology drivers, electrically connected to said USB interface;
   a method for displaying graphics (still photographs, moving images, animation, etc.), for proprietary software and smart transfer technology drivers to retrieve, poll, transfer, and index images on said image display;
   an image retrieval module, for retrieving images from said image memory, algorithmically interfaced to said method for displaying graphics;
   an image display, for display images located in said memory, algorithmically interfaced to said method for displaying graphics;
   an image polling, for detecting if images need to be transferred from said computer via drivers comprised of the patent pending smart transfer technology, algorithmically interfaced to said method for displaying graphics;
   an image transfer, for transferring images from said computer via drivers comprised of the patent pending smart transfer technology, algorithmically interfaced to said method for displaying graphics;
   a configurable image indexing module, for sorting images on said image display via proprietary imaging software, algorithmically interfaced to said method for displaying graphics; and
   a different styles mount on the unit face interchangeable picture frame faces, for changing the physical appearance of the unit.

12. A digital image display system for displaying dynamically changing electronic images for general viewing comprising:
   an image storage, image manipulation computer, for providing images to be transferred;
   an allows data transfer USB cable or other connection method, for providing a means for transferring data, electrically coupled to said computer;
   a picture display picture frame, for display dynamic image, electrically coupled to said USB cable or other connection method;
   a rear bracket, for mechanically supports rear section of said LCD display, mechanically fitted to said USB cable or other connection method;
   a provides regulated power USB power regulator, for regulating power;
   a data and power interface USB connector, for mechanically and electrically connecting, mechanically connected to said USB cable or other connection method;
   an USB interface, for interfacing the USB signal to said display system controller, electrically connected to said USB connector, and electrically connected to said USB power regulator;
   a displays image LCD display, for projecting the stored image on a mosaic LCD or other digital display system in color using proprietary software, electrically connected to said USB power regulator;
   a display system controller, for transfers and manipulates images on said LCD display via proprietary software and smart transfer technology drivers, electrically connected to said USB interface;
   a method for displaying graphics, for proprietary software and smart transfer technology drivers to retrieve, poll, transfer, and index images on said image display;
   a stores image retrieval module, for retrieving images from said image memory, algorithmically interfaced to said method for displaying graphics;
   an image display, for display images located in said memory, algorithmically interfaced to said method for displaying graphics;

an image polling, for detecting if images need to be transferred from said computer via drivers comprised of the patent pending smart transfer technology, algorithmically interfaced to said method for displaying graphics;

an image transfer, for transferring images from said computer via drivers comprised of the patent pending smart transfer technology, algorithmically interfaced to said method for displaying graphics;

a configurable image indexing module, for sorting images on said image display via proprietary imaging software, algorithmically interfaced to said method for displaying graphics; and a style mount on the unit face interchangeable picture frame faces, for changing the physical appearance of the unit.

\* \* \* \* \*